3,049,849
APPARATUS FOR FILTERING GASES
Jean Wiemer, Oberhochstadt, and Heinz Muller, Frankfurt, Germany, assignors to Metallgesellschaft Aktiengesellschaft, Frankfurt am Main, Germany
Filed Aug. 1, 1960, Ser. No. 46,657
Claims priority, application Germany Aug. 12, 1959
8 Claims. (Cl. 55—122)

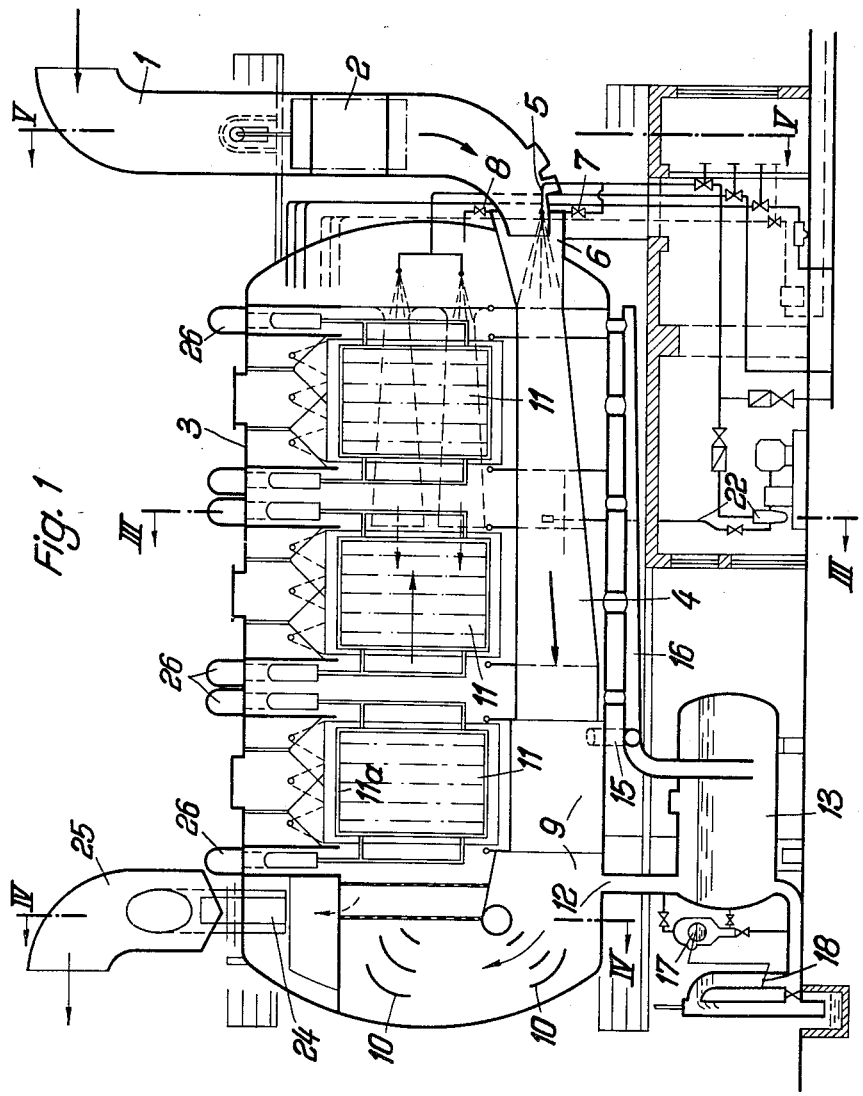

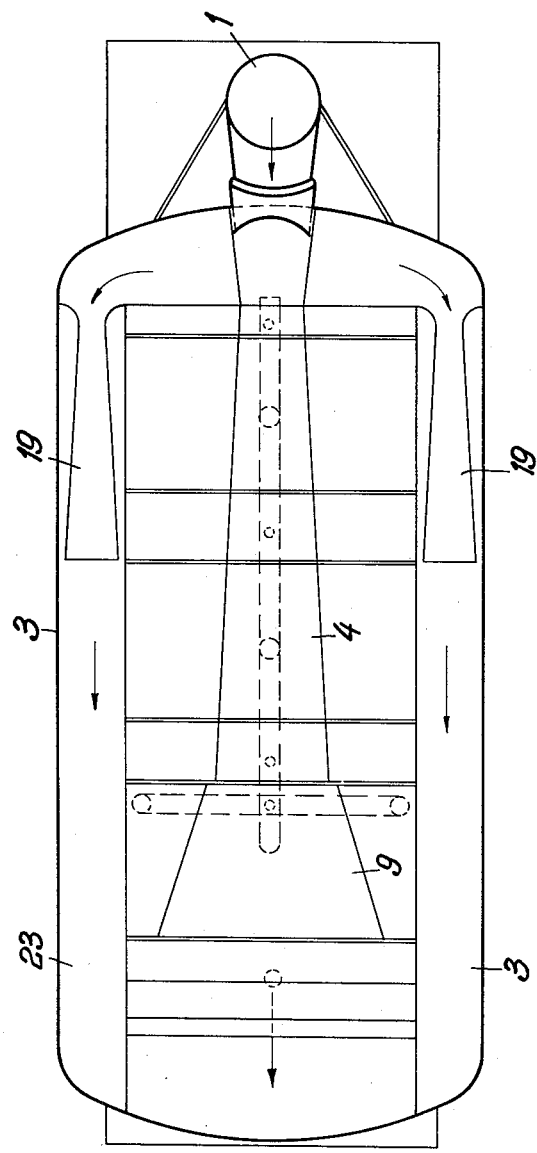

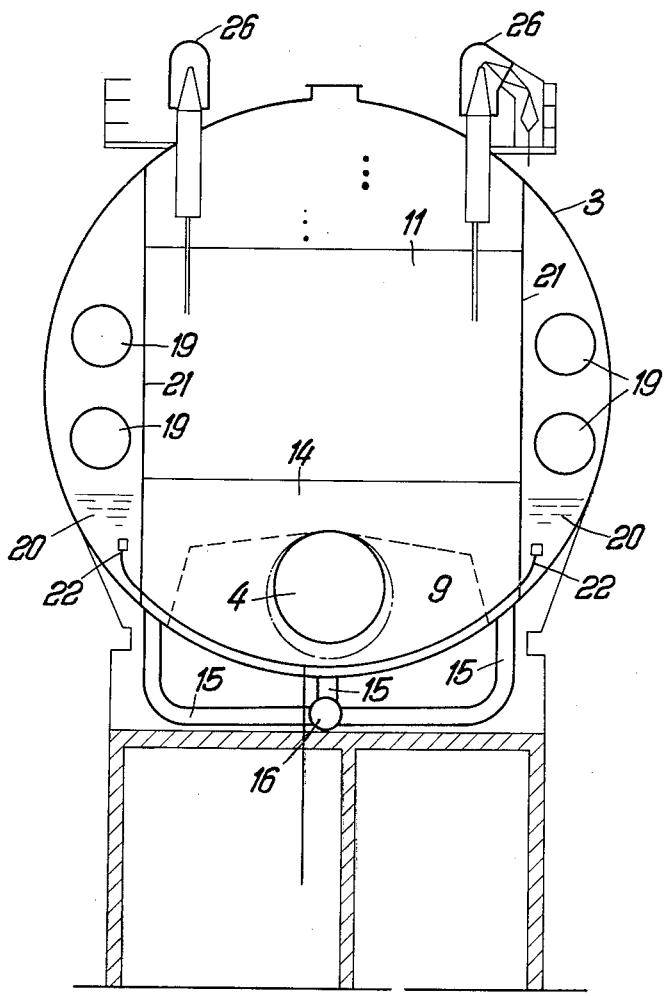

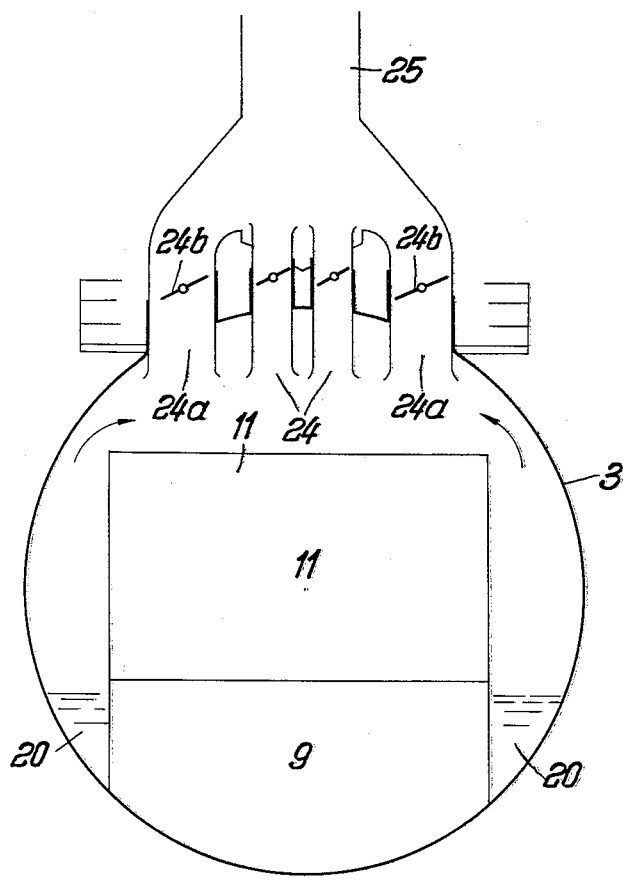

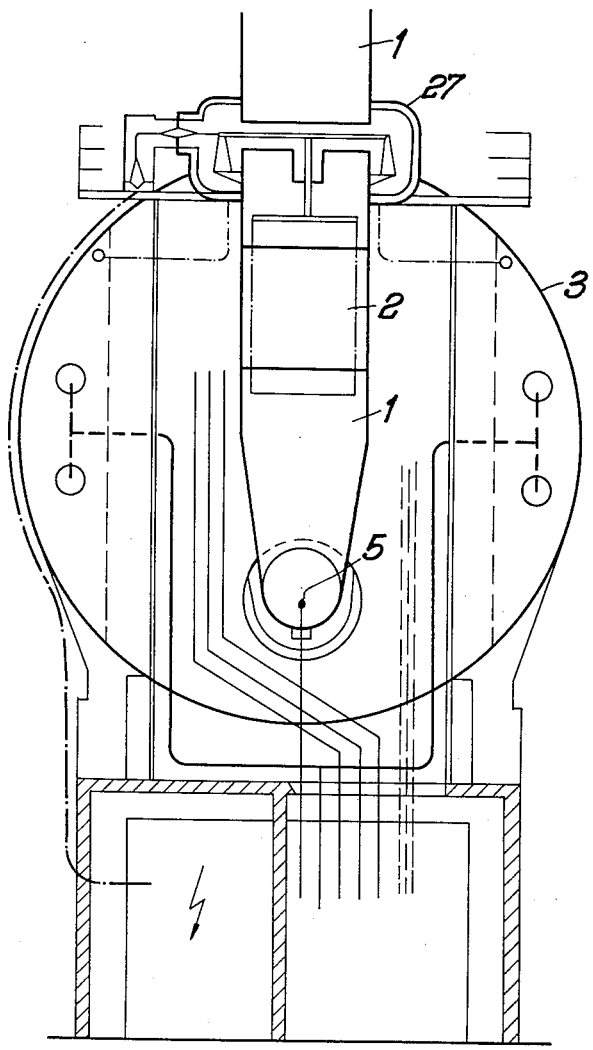

The invention relates to an apparatus for filtering gases, utilizing electric precipitators and washers. It represents an improvement on the apparatus disclosed in application Serial No. 798,107, filed March 9, 1959, now Patent 3,029,578 granted April 17, 1962.

That application discloses an electrofilter provided with a gas washer and, if desired, an ionizing device for the raw gas in front of the gas washer, so constructed that the Venturi tube type gas washer as well as one or more afterwashers, if needed, are arranged in a single housing with the electrofilter, in which the gases are turned repeatedly through 180°, so that the raw gases enter the installation at one side while the clean gas leaves it at the other side. The Venturi prewashers and afterwashers are arranged at the bottom of the electrofilter so that these Venturi pipes form a substantial part of the wall of the housing.

The present invention relates to an improvement on the device described in the earlier application, in which the Venturi tubes are enclosed in a pressure container or pressure vessel, in order to wash as well as to clean electrically gases under super-atmospheric pressure. According to the invention the Venturi tubes which serve as prewashers are arranged in the pressure vessel with their inlets at the bottom or floor thereof. According to a further feature, the Venturi tubes take up only a part of the total cross-section of the vessel, so that at their mouths a free space is left for the broadening of the cross-section of the gas path where the gases are turned through 180°. The electrofilters with their electric sheets by reason of their rectangular cross-section divide the cross-sectional area of the pressure vessel into four cylinder sections, of which preferably the bottom one is occupied by the Venturi washer or washers, the two side ones by the Venturi afterwashers, while in the upper cylinder section the bearing insulators and a pressure gas releasing arrangement in the outlet of the container are positioned.

Further objects and advantages of the invention will appear more fully from the following description, especially when taken in conjunction with the accompanying drawings which form a part thereof.

In the drawings:

FIG. 1 is a vertical cross-section through an apparatus embodying the invention;

FIG. 2 is a horizontal section;

FIGS. 3, 4 and 5 are cross-sections on the lines III—III, IV—IV and V—V respectively of FIG. 1.

The gas enters the gas inlet 1 in which is a preionizer 2. The gas inlet pipe opens into a Venturi tube 4, located in the arched bottom portion of pressure vessel 3, which serves for pre-washing and which at its mouth changes into a very sharply broadened expansion space 9 in the bottom of the pressure vessel 3. The gases passing through the Venturi are, in space 9, turned 180° by baffles 10 and pass in the opposite direction through three electrofilters 11 with spray chambers 11a, these filters being composed of parallel plates in planes parallel to the plane of the paper in FIG. 1, so that the gases pass between the plates. At the end of the three electrofilters, the now cleaned gases are, as shown in FIG. 2, divided between the two side cylinder sections and pass after further turning through 180° through short Venturi afterwashers 19 at the end of the vessel 3 to the pressure gas releasing mechanism 24 in the upper cylinder section and eventually leave the container through the clean gas tube 25.

The frames of the filter plates 11 are supported at each side by insulators which extend into insulator chambers 26 on the outside of the vessel. The insulator chamber 27 for the pre-ionizer is shown in FIG. 5.

Water is supplied to the Venturi prewashers 4 from the sump 20 by pump 22 through nozzle 5.

The Venturi afterwasher 19, which is constructed in the same manner as in the earlier application, is fed with fresh or clarified water, and delivers its wash water into the sump 20, from which the water is pumped by pump 20 to the Venturi washer 4.

The dirty water leaving the Venturi washer 4 flows from the bottom of the pressure vessel 3 through outlet pipe 12 to a second pressure container 13, in which the dirt settles and the water can flow off continuously past a valve 18 controlled by a float 17.

The water used for spraying the electric plates collects in the bottom of the pressure vessel and flows through the outlet pipes 15 into a collecting pipe 16 and then to the pressure vessel 13.

As is shown in FIG. 4, the pressure gas releasing mechanism is located at the outlet of the pressure vessel. It includes two valved passages 24 of small cross-section and two valved passages 24a of larger cross-section. If, for example, in cleaning blast furnace gases the pressure in going through the cleaner is to be reduced from a pressure of 1.5 to 2 atmospheres to atmospheric, all the valves 24b in passages 24 and 24a are opened, whereas, for operation under pressure, the passages 24a are completely closed by the valves and only the narrower passages 24 are opened for the pressure gas release. The pressure washing and electrofiltering according to the invention make it especially easy to carry out the process for the cleaning of blast furnace gases described in German Patent 870,548, in which the precooling of the gases is accomplished by a quantity of water sufficient only for the washing out of dust and the saturation of the gases without cooling in the cycle. For accurate regulation for this purpose there may be connected to the annular space 6 of the inlet of the Venturi washer an additional water supply line controlled by valve 7 or an additional gas line controlled by valve 8 by which clean gas can be supplied from the end of the electrofilters. Because the pressure water nozzle 5 is fed with water of, for example, 5 atmospheres pressure, a slight pressure increase of the gas occurs in the Venturi washer 4, so that a natural drop in pressure of several millimeters of water occurs between the Venturi washer 4 and the end of the electrofilter. On the other hand, a drop in pressure exists in the conical outlet end of the prewasher positioned in the pressure vessel as compared to the clean gas in the vessel.

The Venturi after-washers 19, which are arranged on opposite sides of the electrofilters, can be used as measuring nozzles for measuring the volume of gas. For this purpose the supply of water to one or both of the Venturi after-washers is interrupted, and probes are inserted through openings in the vessel wall which are connected with a manometer. With this arrangement the dynamic pressure difference between the inlet and the throat of the Venturi afterwasher can be measured in a known way. In order to position the probe in the throat, it can be pushed in through the inlet of the Venturi afterwasher or through a special pipe connected with the throat.

From the dynamic pressure difference, of course, a difference in speed can be determined from which, knowing the cross-section of the pipe, the quantity of gas flowing per unit of time can be measured.

We claim:

1. A pressure filter mechanism comprising means forming a substantially closed filtering chamber having electrostatic filtering means therein, said chamber having openings for the inlet and outlet of gas, a Venturi pre-washer within the chamber, said filtering means having its outlet at the end adjacent the inlet opening of the chamber, means connecting said filtering means inlet with the inlet opening of the chamber, said connecting means including said Venturi washer and including means to deflect the gas through 180° between the outlet of the Venturi washer and the filtering means, said connecting means widening sharply at the outlet of the Venturi washer to provide an expansion space in which the gas is turned through 180°, a Venturi after-washer in the chamber, means connecting the filtering means outlet with the outlet of the chamber, said connecting means including the Venturi after-washer, both said Venturi washers being horizontally arranged, means to spray water into said Venturi washers, means connected with the outlets of the Venturi washers to remove water sprayed thereinto, and means in the outlet of the chamber to maintain a pressure therein.

2. In a device as claimed in claim 1, a separating wall adjacent each side of the chamber for forming a space, said Venturi after-washers being each located in one of said spaces, said means for removing water including means connected to said space.

3. In a device as claimed in claim 2, means for feeding water from said collecting space to the Venturi pre-washer.

4. In a device as claimed in claim 3, in which said chamber inlet has a mouth section opening into the Venturi pre-washer with an annular space therearound, means connecting the outlet of the filtering means with said space to furnish clean gas thereto.

5. In a device as claimed in claim 4, said means for maintaining a pressure including a pressure gas releasing mechanism in the outlet.

6. In a device as claimed in claim 4, said outlet comprising pipes of different cross-section, and said means for maintaining a pressure including means for selectively closing said pipes.

7. In a device as claimed in claim 1, in which said chamber inlet has a mouth section opening into the Venturi pre-washer with an annular space therearound, means connecting the outlet of the filtering means with said space to furnish clean gas thereto.

8. In a device as claimed in claim 1, said outlet comprising pipes of different cross-section, and said means for maintaining a pressure including means for selectively closing said pipes.

References Cited in the file of this patent

UNITED STATES PATENTS

| | | |
|---|---|---|
| 2,723,842 | Hall | Nov. 15, 1955 |

FOREIGN PATENTS

| | | |
|---|---|---|
| 755,757 | Great Britain | Aug. 29, 1956 |
| 786,313 | Great Britain | Nov. 13, 1957 |